3,367,088
METHOD FOR TREATING A RAW GAS STREAM
CONTAINING ACETYLENE AND IMPURITIES
John C. Burns, Jr., Pasadena, Tex., assignor to Diamond
Alkali Company, Cleveland, Ohio, a corporation of
Delaware
Filed Dec. 4, 1964, Ser. No. 415,894
7 Claims. (Cl. 55—44)

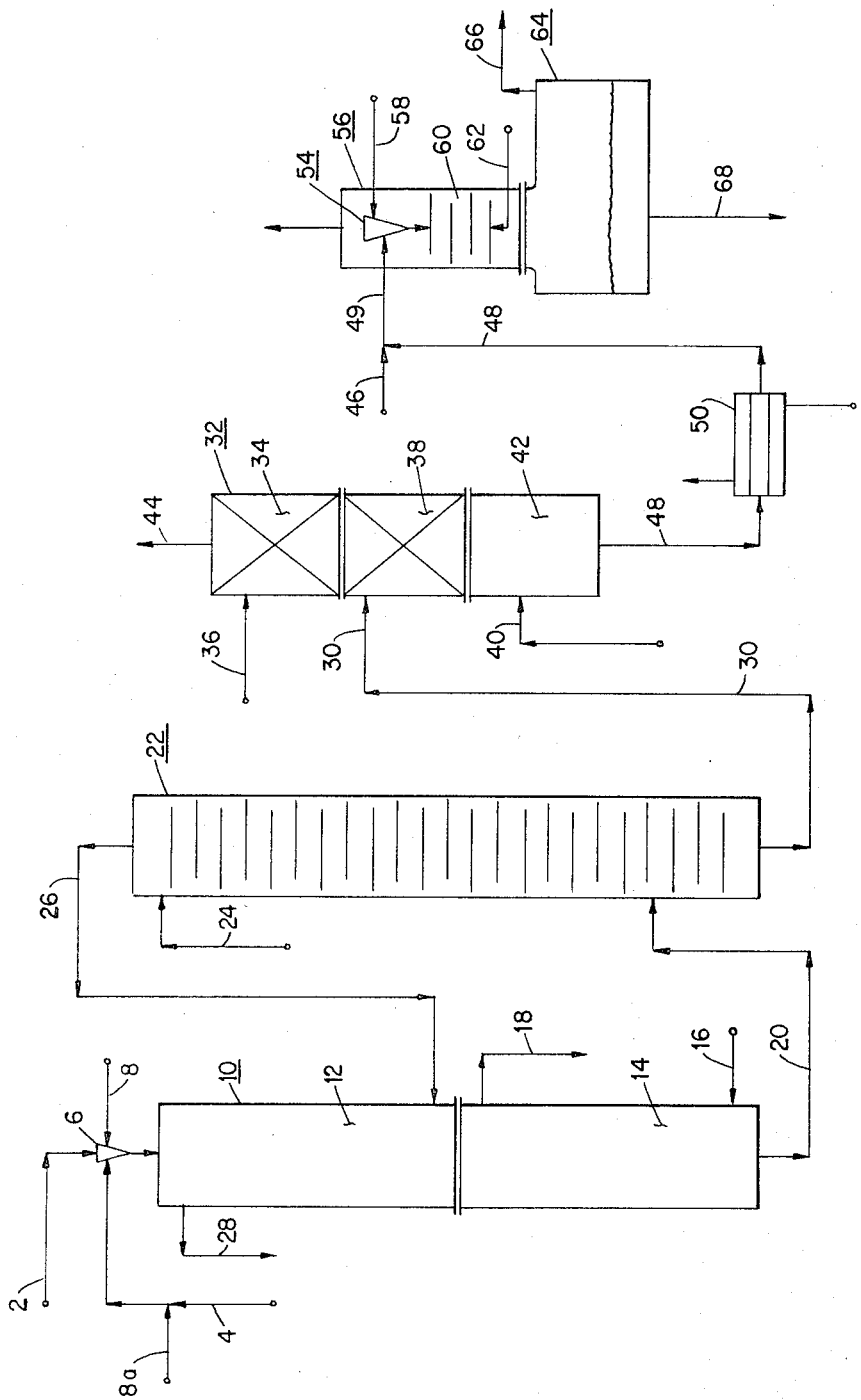

ABSTRACT OF THE DISCLOSURE

An acetylene-bearing gas stream containing impurities such as heavy acetylenes is treated during purification with a solvent mixture comprising a major amount of a water-miscible solvent and a minor amount of a water-immiscible solvent. Impurities removed by the solvent mixture can be stripped from same with an inert gas and the solvents thereafter separated for subsequent use.

---

This invention relates to the production of acetylene by partial oxidation of a lower aliphatic hydrocarbon, and more particularly relates to a method for separating acetylene from impurities by selective absorption.

Acetylene may be produced from lower aliphatic hydrocarbons by reacting preheated natural gas with oxygen in an amount less than that required for complete combustion of the natural gas to carbon dioxide and water. The preheated gas is ordinarily mixed with the oxygen in a mixing chamber, and the mixture is conducted to a flame chamber. The gas stream issuing from the flame chamber, hereinafter referred to as the "raw gas stream," contains acetylene in admixture with various by-products such as carbon (in the form of soot), carbon monoxide, hydrogen, high molecular weight acetylenic hydrocarbons (including diacetylene, vinylacetylene, methylacetylene and the like), tars, naphthalene and other aromatics, and indene and analogous materials. After leaving the flame chamber, the gas stream is contacted with a relatively small amount of heat-absorbing material such as water or steam which absorbs a portion of the heat of the gas stream and arrests the thermal cracking reaction. The stream then passes to one or more quenching zones, wherein additional amounts of heat are absorbed in larger amounts of a suitable liquid and some of the less volatile impurities in the gas stream, including higher molecular weight acetylenes, tars, naphthalene and other aromatics, and indene, along with a substantial amount of carbon in the form of soot, are removed.

Water-miscible organic compounds such as methanol, acetone and dimethylformamide have been used as solvents for the impurities in the acetylene-containing raw gas stream, not only because they are good solvents for many of these impurities (particularly higher acetylenes) but also because the impurities are readily removed from the solvent material—either in the gas phase, in the case of diacetylene, or as a solid or semi-solid precipitate, in the case of aromatics and indene analogs—merely by addition of water to the solvent system. Moreover, these water-miscible solvents are readily separated from water by simple distillation. There remain, however, appreciable qantities of solid and tarry impurities, which, in the subsequent treatment of the gas stream, tend to foul the surfaces of the processing equipment.

A principal object of the present invention, therefore, is to provide a process which reduces or prevents fouling of heat exchange and gas-liquid contact apparatus during separation of impurities from the acetylene stream, and of apparatus for the recovery of the water-miscible solvent used to dissolve these impurities.

A further object is to insure quick release of the impurities from the solvent system, whereby formation of a solid precipitate at this point in the process is lessened, and ready recovery of the water-miscible solvent is effected.

Other objects will in part be obvious and will in part appear hereinafter.

The present invention is directed to the method of treating a raw gas stream obtained by partial oxidation of lower aliphatic hydrocarbons and containing acetylene and, as impurities, higher molecular weight acetylenic hydrocabons, tars, naphthalene and other aromatics, and indene and analogs thereof, which comprises the steps of contacting said raw gas stream with a solvent mixture comprising a major amount of a water-miscible solvent which is liquid at the temperatures and pressures of the separation system, and, combined with said water-miscible solvent, a minor amount of a water-immiscible solvent, said water-immiscible solvent being selected from the group consisting of hydrocarbons and halogenated hydrocarbons which are liquid at the temperatures and pressures of the separation system; and cooling the solvent mixture while in contact with said gas stream to a temperature above the freezing point of said solvent mixture, thereby obtaining a liquid phase containing said impurities and a gas phase containing acetylene together with the components of said raw gas stream not absorbed in said solvent mixture.

Preferred water-miscible solvents for the method of this invention are menthanol and 1-methyl-2-pyrrolidone, but other solvents which are well known to those skilled in the art may also be used. Factors to be considered in the choice of the water-immiscible solvent include its efficacy as a solvent for the impurities and its boiling point and freezing point, which should be such that it remains fluid in admixture with the water-miscible solvent throughout the system. Suitable water-immiscible solvents include xylenes; gasoline; the so-called "varnish-maker's and painter's naphtha," composed of aliphatic and naphthenic hydrocarbons of the $C_{10}$ to $C_{12}$ hydrocarbons both straight and branched chains and normally containing about 48% aliphatic hydrocarbons, about 43% naphthenes (cyclic paraffins) and about 8% aromatics including benzene and xylene; halogenated lower aliphatic hydrocarbons such as carbon tetrachloride, chloroform, methylene chloride, 1,1-dichloroethane, 1,1,2-trichloroethane, 1,1,1 - trichloroethane, 1,2 - dichloroethane, trichloroethylene, perchloroethylene, hexachlorobutadiene, trichlorofluoromethane and the chlorofluoroethanes; and mixtures of these solvents.

Reference is now made to the drawing, which is a flow diagram of a system in which the process of this invention may be practiced. A raw gas stream obtained by partial oxidation of methane with oxygen, containing acetylene and the above-identified impurities, is quenched as described hereinabove. Following the final quenching step, the raw gas stream may be conducted through conduit 2 simultaneously with the desired water-miscible and water-immiscible solvents, into a gas-liquid mixer 6 wherein the gas and liquid phases are brought into intimate contact. Alternatively, the solvents may be introduced separately into the liquid mixer through conduits 4 and 8, or they may be combined. Still another alternative is to introduce the water-immiscible solvent upstream from the mixer 6, and since the quantity of such solvent is relatively small and the temperature of the gas stream is generally high enough to cause its partial vaporization, the solvent enters the mixer largely as a vapor along with the raw gas stream and is liquefied upon contact with the water-miscible solvent. The percentage, by volume, of water-immiscible solvent in the mixture at the point where the solvents are first combined may be as high as about 25%; the percentage, however, becomes progressively lower as further amounts of water-miscible solvent are introduced during the later stages of the process (as described hereinafter) and is generally 5% or less in the final stages.

The gas-liquid mixture formed as the solvent is introduced and conducted into an indirect heat exchanger 10, which is desirably of the shell-and-tube type but may be of some other construction, which heat exchanger comprises the first stage 12 of a multi-stage cooling tower, and thence into a second-stage indirect heat exchanger 14, wherein the mixture is cooled to a temperature of about −25° F. The refrigerant for this second heat exchanger is supplied through line 16 and leaves the heat exchanger through line 18.

The mixture of liquid and gas leaving the heat exchanger 14 passes through conduit 20 into absorber tower 22, preferably of the tray type for gas-liquid contact, wherein the gas phase flows upward in countercurrent contact with a further stream of water-miscible solvent introduced through conduit 24, which solvent is preferably cooled to substantially the same temperature as the gas entering the absorber. The relatively volatile impurities which have escaped with the gases introduced through line 20 are absorbed in this additional solvent. For the sake of economy, the gas stream issuing from the top of the absorber tower 22 is preferably conducted by a suitable conduit 26 to the first stage 12 of indirect heat exchanger 10, to cool the incoming gas-solvent mixture, the gas stream then issuing from the indirect heat exchanger 10 through line 28 to processing equipment for for the recovery of acetylene therefrom.

As the water-miscible solvent descends in absorber tower 22, it is combined with the liquid phase introduced through conduit 20, thereby forming a mixture referred to hereinafter as the "second solvent mixture." This mixture contains the impurities previously described.

The second solvent mixture is removed from absorber tower 22 through line 30 and introduced into column 32, which functions both as an absorber and as a stripper for removal of the small amount of acetylene remaining in the mixture. The column 32 is operated at a substantially lower pressure than that of the absorber column 22 and the dissolved acetylene, together with some of the more volatile higher molecular weight acetylene compounds such as vinylacetylene and methylacetylene, is stripped from the second solvent mixture by an inert stripping gas introduced through line 40 and rises in the column to the absorber section 34, into which is introduced a further quantity of cooled water-miscible solvent through line 36. This solvent passes in countercurrent contact with the gases issuing from stripping section 38 and absorbs most of volatile higher acetylenes escaping from section 42 of column 32. The solvent and the liquid phase introduced into column 32 through line 30 are combined in the lower portion 42 of column 32, thereby forming what is hereinafter identified as the "third solvent mixture." The gases issuing from the absorber section 34 pass through line 44 to the acetylene recovery apparatus and the third solvent mixture leaves the lower portion of column 32 through line 48, passing through an indirect heat exchanger 50 wherein the temperature is increased to about 25–35° F.

The third solvent mixture leaving heat exchanger 50 is passed through line 48 into mixer 54 in the upper portion of stripping column 56, wherein it is combined with water introduced through line 58, thereby forming a mixture of aqueous and non-aqueous phases, the aqueous phase containing the water-miscible solvent and the non-aqueous phase containing the water-immiscible solvent together with dissolved impurities. Optionally, a further small quantity of water-immiscible solvent may be introduced through line 46 into the third solvent mixture before the latter reaches mixer 54.

The mixer of aqueous and non-aqueous liquid is passed from mixer 54 into the stripping section 60 wherein it is brought into countercurrent contact with an inert stripping gas introduced through line 62 at approximately atmospheric pressure, whereby the diacetylene and other volatile acetylenic compounds are stripped from the liquid mixture. The mixture may then be passed into decanter 64 wherein the aqueous and non-aqueous phases are separated. In the event that gas-liquid separation is not complete, the stripping and decanting operations may be repeated.

Depending upon whether the aqueous phase has a higher or lower specific gravity than the non-aqueous phase, the former may be withdrawn from the decanter either through line 68 or line 66, respectively, for recovery of the water-miscible solvent. If the non-aqueous phase is heavier, such as in the case of chlorinated lower aliphatic hydrocarbons, then the aqueous phase is withdrawn through line 66 and the non-aqueous phase through line 68 for separate recovery and recycle of the solvents.

Further details of the invention may be gained from the following description in terms of temperatures, pressures, and quantities of materials in various parts of the system as the treatment of the gas and liquid phases progresses.

A raw gas stream from a flame chamber in which methane is partially oxidized with oxygen has the following typical analysis:

| | Percent |
|---|---|
| Hydrogen | 52.5 |
| Carbon monoxide | 26.0 |
| Carbon dioxide | 3.7 |
| Methane | 4.9 |
| Acetylene | 8.0 |
| Atmospheric gases | 3.2 |
| Higher acetylenes, tars and hydrocarbon compounds | 1.7 |

This raw gas is introduced at the rate of 247.8 gallons per minute (g.p.m.) through line 2 into gas-liquid contact mixer 6 wherein the gases are brought into intimate contact with methanol, which is introduced through line 4 at the rate of 10 g.p.m. Gasoline is introduced through line 8 or 8a at about 2 g.p.m. The raw gas solvent mixture passes into the first stage 12 of multistage heat exchanger 10 wherein it is cooled to a temperature of 40° F. by the cooled gas issuing from absorber 22 through line 26, the cooling gas finally leaving heat exchanger 10 through line 28 to a processing apparatus for recovery of acetylene. The solvent-gas mixture then passes through the second stage 14 of heat exchanger 10, in indirect heat exchange relation with a refrigerant whereby the gas is further cooled to a temperature of about −25° F. The cooled gas is withdrawn from the second stage 14 through line 20 and is introduced into absorber 22, wherein it passes in direct countercurrent contact with an additional amount of methanol introduced into absorber 22 through line 24 at the rate of 25 g.p.m., the temperature of the methanol being substantially the same as that of the gas and liquid phases introduced in the lower portion of absorber 22. The methanol passes downward through absorber 22, dissolving the higher molecular weight acetylenes, tars, aromatics, and indene analogs in the upward-moving gas stream. It is preferred that the pressure in absorber 22 near the bottom thereof be maintained within the range of 30–33 p.s.i.g., and that the pressure at the top of the absorber be maintained within the range of 20–23 p.s.i.g., in order to promote gas flow through the absorber column and maximum absorption of the impurities, particularly diacetylene. The liquid phase leaving absorber 22 through line 30 now contains methanol and gasoline in the proportion of about 20 volumes of methanol per volume of gasoline.

The second solvent mixture passes from absorber 22 through line 30 and is then introduced into stripper-absorber column 32 at the rate of 37 g.p.m., preferably at a point above the mid-point of stripping section 38, wherein the pressure is substantially lower than the pressure in absorber 22 and is preferably about 2–3 p.s.i.g. In stripping section 38 the second solvent mixture is passed in countercurrent contact with an inert stripping gas introduced into the lowermost section 42 of column 32 by way of line 40. The stripping gas may be the mixture of carbon monoxide and hydrogen forming the principal part of the gas stream initially introduced into this system, after substantially all of the acetylene has been removed therefrom.

The stripping gas in stripping section 38 removes substantially all of the acetylene remaining dissolved in the second solvent mixture, after which the combined gases rise to the absorber section 34 of column 32, wherein there is introduced through line 36 a further quantity of methanol to remove gaseous higher acetylenic compounds, such as diacetylene, vinylacetylene, methylacetylene and the like, so that the off-gas from the absorbing section contains predominantly the stripping gas together with acetylene, and this gas mixture is then taken overhead for recycle into the main gas stream downstream of the final quenching step.

The further quantity of methanol introduced into column 32 passes downward at about 5 g.p.m. in countercurrent contact with the gases therein, and ultimately combines with the second solvent mixture in the lower portion 42 of column 32 to form a third solvent mixture. The temperature of the third solvent mixture at this point is preferably about 10–15° F. above that of the absorption column, the increase in temperature being due to the heat of the warm stripping gas introduced into the lower section 42 of column 32.

The third solvent mixture passes from column 32 through line 48 and into indirect heat exchanger 50 where it is warmed still further, preferably to a temperature of about 50–60° F. above that encountered in the absorber 32, and is then conducted by way of line 49 into column 56 through a liquid-liquid contact mixer 54 where it is intimately mixed with water at a temperature of about 110–120° F., thereby causing the release of a substantial portion of the gaseous acetylenic compounds from the aqueous and non-aqueous liquid mixture. The liquids falling downward in column 56 are stripped by a countercurrently flowing stream of inert gas at atmospheric pressure, which again may be the mixture of carbon monoxide and hydrogen present initially in the gas mixture. In this manner the diacetylene and other polymerizable acetylenes which may form explosive polymers are substantially diluted by the stripping gas and swept out of the system in dilute admixture therewith after which they may be used as fuel or harmlessly ignited in a flare exposed to the atmosphere.

With most of the diacetylene and other undesirable gaseous acetylenic compounds stripped from the liquid phase in stripping section 60 by the gas introduced through line 62, there is little danger of accumulation of sufficient amounts of these compounds in the decanter 64 to cause an explosion, and thus operation of the equipment is rendered free from the difficulties encountered when these compounds accumulate therein.

By the use of a water-miscible and a water-immiscible two-component solvent system for the removal of diacetylene, higher acetylenic compounds, naphthalene, tars, and polymers of acetylene in the manner described hereinabove, fouling of the equipment downstream from this portion of the process, wherein the off-gas from absorber 22 is further processed to recover the acetylene contained therein, is avoided. Also avoided is the deposition of solids in the process equipment shown in the drawings, as well as in the process equipment downstream therefrom, and this equipment, which constitutes a major portion of the acetylene recovery process, remains clean many times longer than when only a one-component solvent system is employed. Further, purification of the water-miscible solvent prior to its recycle is facilitated by the method of this invention.

It has also been found that the higher molecular weight acetylene polymers, whose formation can be substantially decreased but not entirely avoided by using the method of this invention, are not pyrophoric but are relatively inert solids which are easily disposed of. That this is a result of the presence of the water-immiscible solvent is indicated by the fact that pyrolysis of the polymer affords acetylene, higher molecular weight acetylenes and the hydrocarbon or substituted hydrocarbon used as the water-immiscible solvent. It is not clear whether the solvent is chemically combined, occluded or bound by hydrogen bonds or the like into the polymer.

It is to be understood that, although the invention has been described with specific reference to particular embodiments thereof, it is not to be so limited, since changes and alterations therein may be made which are within the full intended scope of this invention as defined by the appended claims.

What is claimed is:

1. A method for treating a raw gas stream containing acetylene and, as impurities, higher molecular weight acetylenic hydrocarbons, tars, naphthalene and other aromatics, and indene and analogs thereof, which method includes the steps of:
   (A) Contacting said raw gas stream with a solvent mixture comprising a major amount of a water-miscible solvent for acetylene and said impurities, which solvent is liquid at the temperatures and pressures of the separation system, and, dissolved in said water-miscible solvent, a minor amount of a water-immiscible solvent for said impurities, said water-immiscible solvent being selected from the group consisting of hydrocarbons and halogenated hydrocarbons which are liquid at the temperatures and pressures of the separation system, and cooling said solvent mixture while in contact with said raw gas stream to a temperature below the boiling point and above the freezing point of said solvent mixture, thereby forming (1) a first liquid phase containing said impurities and (2) a first gas phase containing acetylene together with the components of said raw gas stream not absorbed in said solvent mixture;
   (B) Scrubbing said gas phase (2) with a second quantity of said water-miscible solvent and combining said second quantity with said liquid phase (1), thereby forming a second solvent mixture;
   (C) Stripping said second solvent mixture with an inert gas, passing the resulting gas phase in contact with a third quantity of said water-miscible solvent to form a second liquid phase (3) and a second gas phase (4), and combining said second liquid phase (3) with said second solvent mixture to form a third solvent mixture;
   (D) Adding water to said third solvent mixture to form a mixture of aqueous and non-aqueous liquid phases, separating said phases, and separately recovering said solvents from said liquid phases, and
   (E) Recovering acetylene from said gas phases (2) and (4).

2. The method of claim 1 wherein the volume of water-immiscible solvent is up to about 20% of the total volume of solvent introduced during step (A).

3. The method of claim 2 wherein the scrubbing and stripping steps (B) and (C) are performed by passing the gas phases upward and the liquid phases downward through counter-current contact zones, and the pressure in the stripping zone is substantially lower than that in the scrubbing zone.

4. The method of claim 3 wherein the volume of water used in step (D) is about 1–5 times the volume of said third solvent mixture.

5. The method of claim 4 wherein the water-miscible solvent is selected from the group consisting of methanol and 1-methyl-2-pyrrolidone.

6. The method of claim 5 wherein the solvent mixture used in step (A) is contacted with the gas stream at a temperature of about −25° F.; the pressure during the scrubbing step (B) is about 20–30 p.s.i.g. above atmospheric pressure, that of the stripping step (C) is about one-tenth that of the scrubbing step, and that of separation step (D) is approximately atmospheric; and said third solvent mixture is warmed to about 50–60° F. above the temperature during the scrubbing step (B) and combined with water at a temperature no lower than that of said combined liquid phases.

7. The method of claim 6 wherein the water-immiscible solvent is fed into the raw gas stream upstream from step (A) and is partially vaporized by said raw gas stream.

References Cited

UNITED STATES PATENTS

| | | | |
|---|---|---|---|
| 2,925,384 | 2/1960 | Konigstein et al. | 260—679 |
| 3,026,969 | 3/1962 | Braconier et al. | 55—65 |
| 3,152,194 | 10/1964 | Pohl et al. | 55—64 |
| 3,199,266 | 8/1965 | Quester et al. | 55—48 |

REUBEN FRIEDMAN, *Primary Examiner.*

C. N. HART, *Assistant Examiner.*